Dec. 23, 1952   E. W. SILITCH ET AL   2,622,683
APPARATUS AND METHOD FOR THE COLLECTION OF WATER
Filed Aug. 7, 1947   4 Sheets-Sheet 1

INVENTORS
EUGENE W. SILITCH
ADOLPH d'AUDIFFRET
BY
Toulmin & Toulmin
ATTORNEYS

Dec. 23, 1952   E. W. SILITCH ET AL   2,622,683
APPARATUS AND METHOD FOR THE COLLECTION OF WATER
Filed Aug. 7, 1947   4 Sheets-Sheet 2

INVENTORS
EUGENE W. SILITCH
ADOLPH d'AUDIFFRET
BY
Toulmin & Toulmin
ATTORNEYS

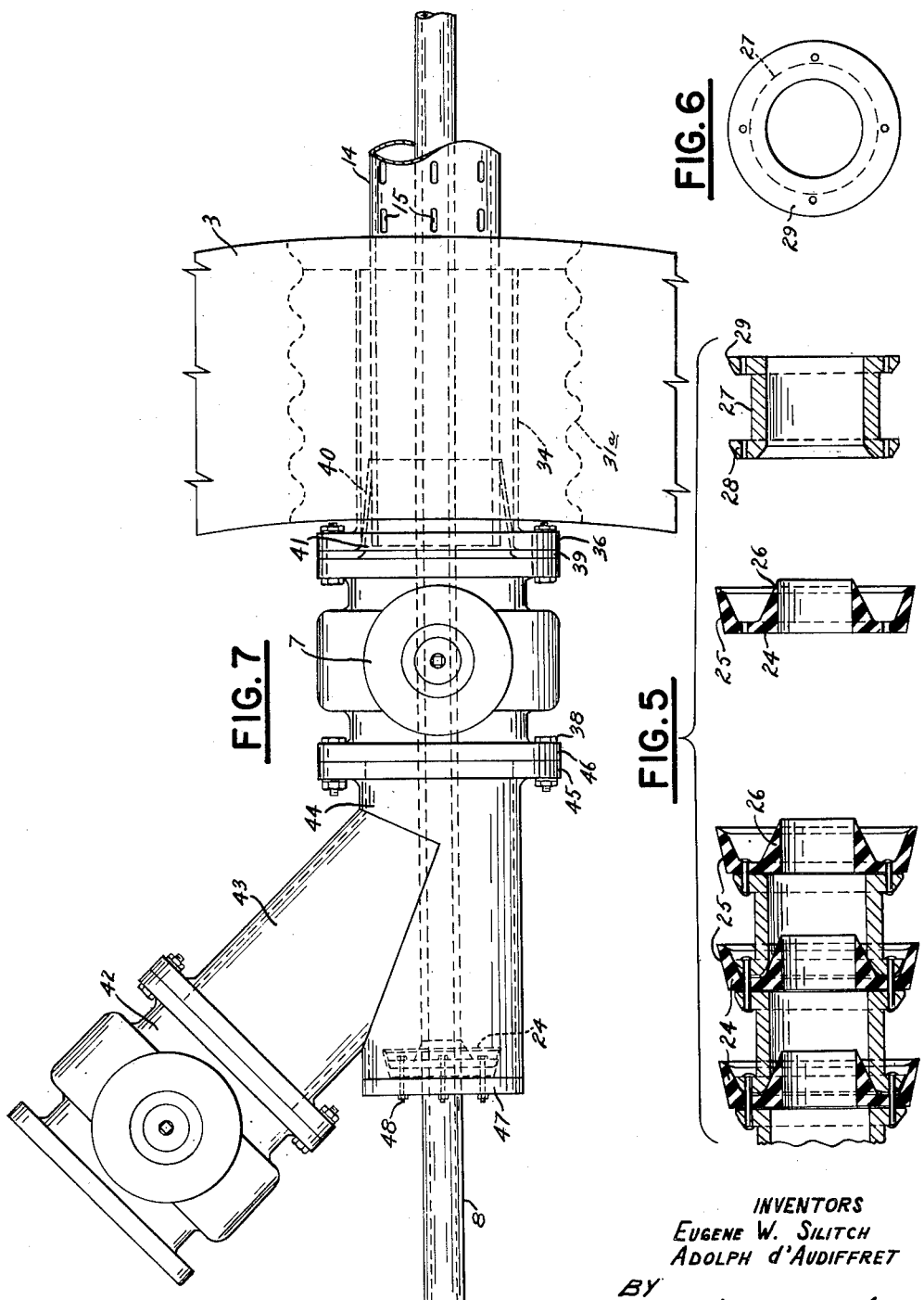
Dec. 23, 1952  E. W. SILITCH ET AL  2,622,683
APPARATUS AND METHOD FOR THE COLLECTION OF WATER
Filed Aug. 7, 1947  4 Sheets-Sheet 3
INVENTORS
EUGENE W. SILITCH
ADOLPH d'AUDIFFRET
BY
Toulmin & Toulmin
ATTORNEYS Dec. 23, 1952     E. W. SILITCH ET AL     2,622,683
APPARATUS AND METHOD FOR THE COLLECTION OF WATER
Filed Aug. 7, 1947     4 Sheets-Sheet 4
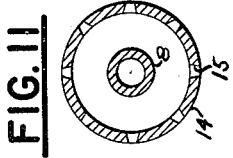
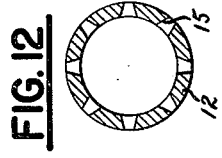
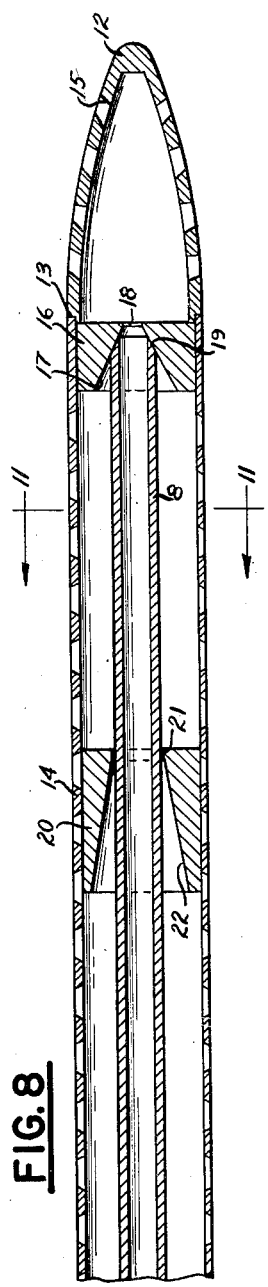
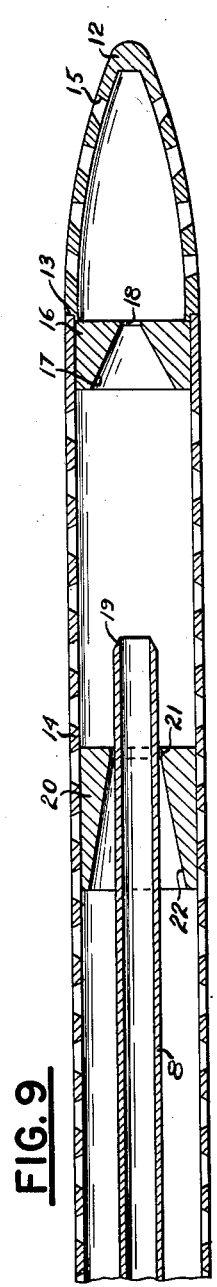
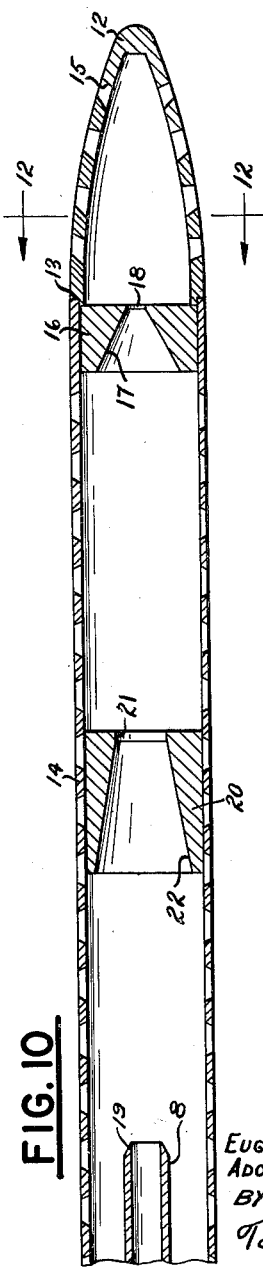
INVENTORS
EUGENE W. SILITCH
ADOLPH d'AUDIFFRET
BY
Toulmin & Toulmin
ATTORNEYS Patented Dec. 23, 1952

2,622,683

UNITED STATES PATENT OFFICE 2,622,683

APPARATUS AND METHOD FOR THE COLLECTION OF WATER

Eugene W. Silitch and Adolph d'Audiffret, Columbus, Ohio, assignors to Ranney Method Water Supplies, Inc., Columbus, Ohio, a corporation of West Virginia Application August 7, 1947, Serial No. 767,150

7 Claims. (Cl. 166—1)

Our invention relates to an apparatus and method for the collection of water.

In particular it relates to water production for industrial and municipal use by abstracting water from the ground or by infiltration through permeable beds of rivers or other bodies of water.

It is an object of the invention to provide in or adjacent to a stream or river or other body of water a caisson shaft at the bottom of which, or adjacent to the bottom, are a plurality of radial pipes adapted to deliver the water from the surrounding area into the caisson from which it is pumped to the point of use.

It is an object of the invention to provide the exposure of a large area of water-bearing formation to horizontal screened pipes, extending from the caisson, the number and area of which can be extended at will.

It is a further object to provide for the selective removal of the fine material from the aquifer in the vicinity of the screens and the formation thereby of more permeable ground or a gravel pack adjacent to the screen, so that each installation consists of a series of radiating drainage channels emptying into a central shaft.

It is a further object to provide access to, and independent control of, each radial pipe both during the period of its insertion into the ground and during its operation after being located to thereby permit easy backwashing or flushing of each screened section separately.

It is an object to provide such horizontal collecting pipes so that they are located for their entire length below the drawdown level of the inground water so as to develop a water supply, the temperature and quality of which may be substantially constant and which is derived from the adjacent stream or other body of water after an extended period of movement through the filtering body of the surrounding ground.

It is an object to provide for the selective removal of fine sand and silt throughout the entire length of the screened pipe lines to form a bed of coarser gravel of very high permeability surrounding each pipe.

It is an object to maintain the velocities sufficiently small of the entering water to eliminate the sharp drop in water pressure at the entrance to the screens.

It is a particular object of this invention to prevent clogging of the screened pipes particularly during insertion into the ground as these pipes are sometimes extended to as much as three hundred feet from their point of origin at the caisson.

It is an object to prevent such pipes from accumulating fines and gravel within them and causing the pipe to sag or bend so that the outer end will rise out of the horizontal plane in which it should normally be located.

It is a particular object of the invention to provide a detachable head for the screened pipes.

It is a further object to provide a non-collapsible, adjustable packer and an interiorly arranged adjustable water removal pipe slidably arranged within guides within the exterior screened pipe that is utilized to penetrate the soil.

It is an object of this adjustability to regulate the elimination of the fines within the screened pipe to prevent sagging and bending and deflection of the pipe. This invention overcomes this difficulty heretofore met in the art.

It is an object by this arrangement to provide a method by which all of the water entering can be concentrated either at the small entering end of the screened pipe to provide the maximum evacuation of fines or to move the pipe to its second position to give the maximum of turbidity so that if the fines are very fine they may be stirred to prevent clogging and to provide in the third position the maximum water to clean out the sand and gravel in the screened pipe to prevent sagging of the pipe and to permit of easier pushing of the screened pipe into the soil.

It is a further object of the invention to provide a system of valves in the caisson connected to the screened pipe for regulating the flow of water into the caisson and for regulating the extraction of any entrained fines while at the same time permitting of ready adjustment of the interiorly located, slidable water removal pipe operating within the screened pipe while at the same time providing an adjustable seal between the exterior of the water pipe and the interior of the screened pipe and a permanent seal between the interior of the valve housing and the exterior of the screened pipe.

Referring to the drawings,

Figure 5 is a detail of the adjustable sealing packer between the exterior of the water pipe and the interior of the screened pipe. In this view the several parts are blown apart to show the method of assembly.

Figure 6 is an end elevation of one of the connecting sleeves.

Figure 7 is a view similar to Figure 4 but at right angles thereto showing in plan view the arrangement of the several valves for controlling the discharge of water and of any accumulated silt, fines, etc.

Figure 8 is the first of three views (Figures 8, 9 and 10) showing diagrammatically the outer end of the screened pipe, the guides for the water pipe and the water pipe in section in three adjusted positions.

Figure 8 shows the water pipe at the extreme outer end of the screened pipe adjacent its nose.

Figure 9 shows where the water pipe has been retracted to its intermediate position.

Figure 10 shows where it has been retracted to its rearmost position.

Figure 11 is a section on the line 11—11 of Figure 8, looking in the direction of the arrows, showing the sectional arrangement of the screened pipe at this point.

Figure 12 is a section on the line 12—12 of Figure 10, showing in section the port arrangement in the tapered head of the screened pipe.

Figure 1:
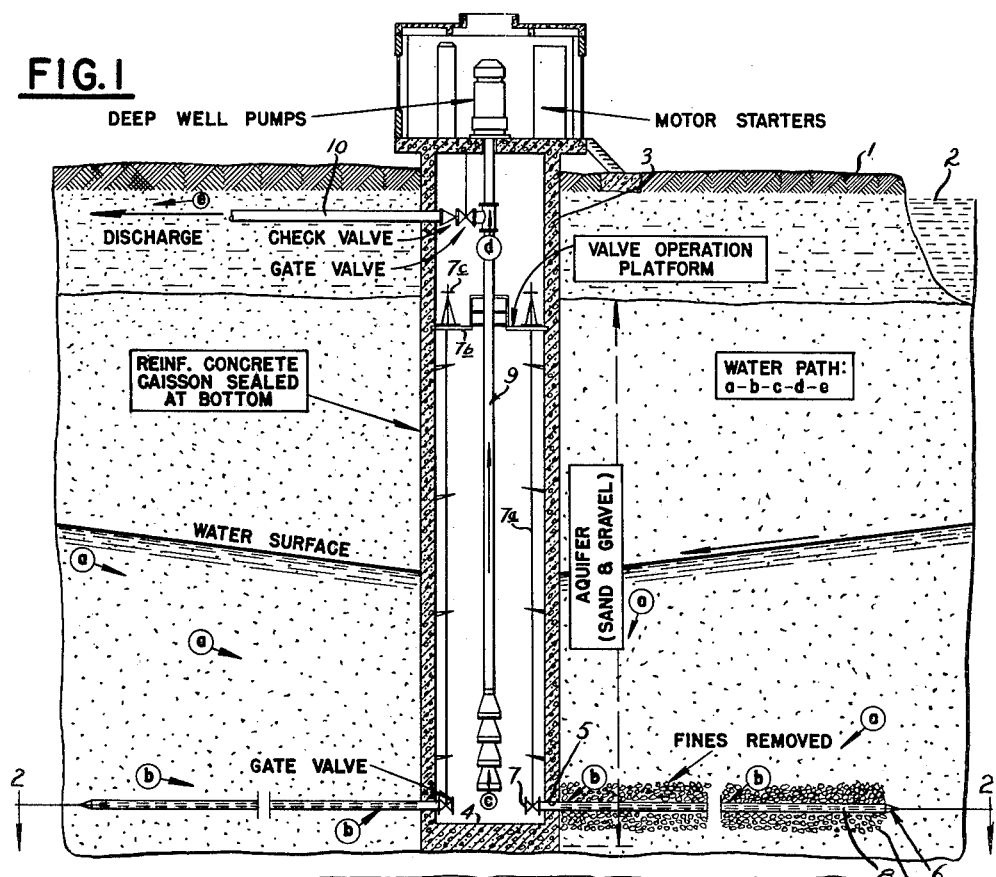
Figure 1 is a vertical section through a typical installation of the apparatus of this invention.
Figure 2:
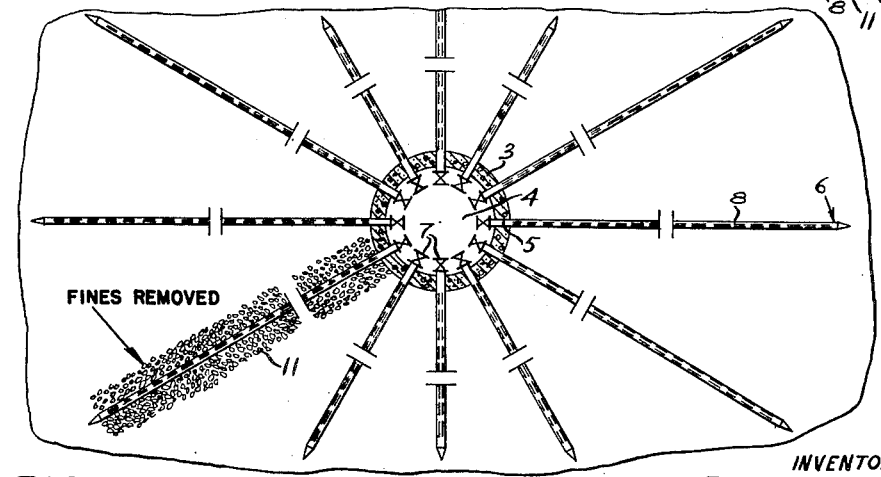
Figure 2 is a section on the line 2—2, looking downwardly in the direction of the arrows, showing the radial arrangement of the screened pipes.
Figure 3:
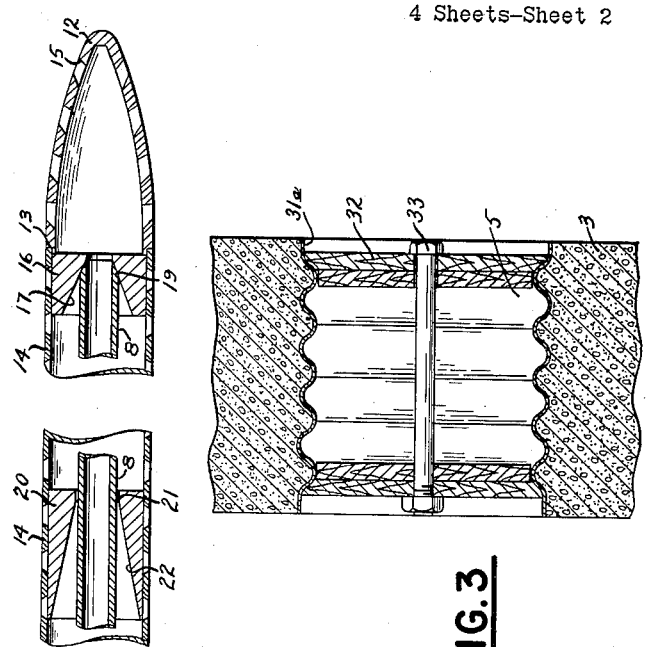
Figure 3 is a section through a portion of the wall of the caisson showing the method of plugging the horizontal hole adapted to receive the screened pipe and its associated mechanism after the plug is removed.
Figure 4:
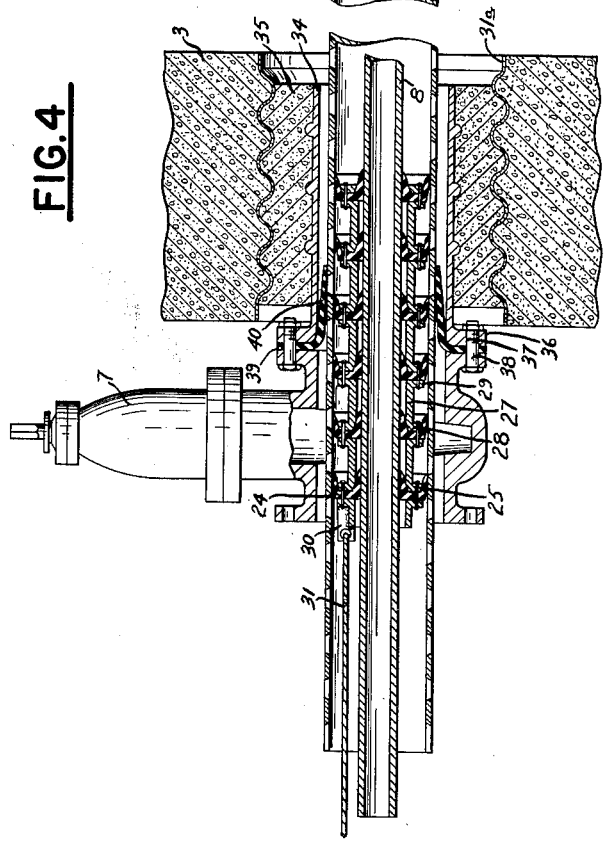
Figure 4 is a similar view with the screened pipe, its water pipe, packings and valve pipe and valve in located position.

Referring to the drawings in detail, 1 indicates the top of the soil adjacent to a stream 2. 3 indicates the caisson preferably made of concrete adjacent the bottom of which at 4 are a plurality of radially disposed openings 5 in which are mounted radially disposed, screened pipes and associated mechanism generally designated 6. The exit within the caisson from the screened pipe 6 is controlled by a valve 7. The water is discharged through the screened pipe, the water pipe 8, valve 7 into the interior of the caisson from whence it is pumped by any conventional pumping mechanism designated 9 and discharging through the discharge line 10 to the point of use.

This water pipe 8 is given the name water pipe as a designation but it in effect conveys away the fines with the water and after its removal from the screened pipe; thereafter the screened pipe carries primarily the main body of water which is delivered to the caisson.

It will be noted that the water which is filtered from the stream 2 down through the ground passes through an area designated 11 of relatively coarse gravel from which the fines have been removed by the method hereinafter described so that an area around each screened pipe 6, of relatively coarse gravel of from four to six feet, is provided. The screened collector pipes can be pushed to various lengths and under favorable conditions can be extended more than three hundred feet from the caisson. Thus, it is possible to project these perforated, screened pipes, for instance about eight inches in diameter, horizontally into the aquifer through selected levels through the precast port holes 5 in the lower caisson walls. The number of pipes is determined on the basis of capacity of water desired and hydro-geological conditions encountered. As heretofore stated, on the end of each pipe is a gate valve 7, to which is connected an extension stem 7a extending up through a valve operating platform 7b where a handle 7c provides means of operation for the valve 7. Multiple stage, deep well pumps are provided having their columns extending down into the caisson shaft which is a clear well.

The particular problem involved in this arrangement is to drive the screened pipes and associated mechanism in a horizontal plane, to keep them free of accumulated fines and gravel, to prevent them from sagging and to prevent them from turning upwardly at the outer ends out of the horizontal plane when they do sag.

The problem is to effect the selective removal of fine sand and silt throughout the entire length of the screened pipe lines, to provide an area of coarser gravel, in excess of four feet, of very high permeability around the pipe. It is this permeable, coarse gravel generally that delivers the water into the shaft by means of the projected screened pipe 6. It is also a problem to seal the water pipe within the screened pipe and seal the screened pipe with respect to valve control mechanism.

The following are the detailed constructions of this invention in one embodiment.

The head 6 of pipe 14 is provided with a conical, streamlined nose 12 which is detachable at 13 from the outer end of the main body of the screened pipe 14. This nose is provided with a plurality of openings 15 through which the fines and water can enter. In the outer end of the main screened pipe 14, adjacent the inner end of the nose 12, is an abutment or plug 16 having a forwardly directed and constricted tapered opening 17 terminating in a passageway 18 leading from the interior of the main screened pipe 14 to the interior of the nose 12. This inner tapered wall 17 of the plug 16 serves as an abutment for the tapered end 19 of the adjustable, slidable water pipe 8.

Referring in detail to Figures 8 to 12 inclusive, and particularly to Figures 8 to 10 inclusive, it will be noted that the pipe 8 is in three positions. In normal operation, as the screened pipe is projected into the soil, sufficient water is introduced through the openings 15 and the nose 12, because of the fact that all water is concentrated in that small area to evacuate the maximum amount of the fines. Pipe 8 is made up of sections coupled together as the pipe is projected from within the caisson so the said pipe can be of whatever length is necessary.

But in the event that there is not enough water entering the head and the maximum of turbidity is desired, then the forward end 19 of the water pipe 8 is retracted to the position shown in Figure 9 within the tubular guide block 20 having the aperture 21 and a tapered interior 22 through which slides the pipe 8. By reason of this maximum turbidity if the fines are very fine it is possible to prevent the clogging and to secure the desired flow and the removal of the smaller fines.

In the event that this is not sufficient, then the water pipe 8 is retracted to its position shown in Figure 10 so as to clean all sand and gravel from the pipes, thereby preventing sagging of the screened pipe and permitting easier pushing of the screened pipe into the soil.

It will be noted that the screened pipe has a series of openings 15 which are larger in the interior of the pipe than the exterior and it is through these openings that the fines, small gravel and water enter the screened pipe.

The screened pipe is driven into the soil by any suitable means, such as, hydraulic jacks, and during these adjustment periods removal is made of sand and gravel through the water pipe 8 to eliminate bending of the screened pipe due to the fines and gravel.

Now turning to the sealing of the space between the adjustable water pipe 8 and the interior of the screened pipe 14, it will be observed that a plurality of resilient washers 24 are provided to form a sealing packer. The washers 24 comprise an outer flaring skirt 25 which engages the inside of the screened pipe 14, and an inner skirt 26 which engages the outer surface of the water pipe 8. Between these washers are connecting sleeves consisting of an annular body 27 having flanges 28 and 29 engaging respectively with the inside of one washer and the outside of the next adjacent washer. These flanges are provided with passageways corresponding to similar passageways in the wall 24 so as to connect by rivets or otherwise the washers and the connecting spacer sleeves 27 to one another to form a flexible chain of washers that will withstand horizontal thrust, will bend with the movement of the water pipe and screened pipe and may be shifted as a body backwardly in pipe 14, or held in place therein through the connecting eye 30, to which is connected an adjusting cable 31 which extends out of the rear end of the screened pipe 14.

This sealing packer is dismountable and can be made in as many sections as is necessary to fit diversified ground conditions. The plate holding the rubber packer cup covers the entire area of the cup between its flanged edges, acting as reinforcement and permitting the use of this sealing packer under very high pressure without danger of collapse.

In order to provide a support for these pipes and to permit the insertion through the wall of the caisson, when the concrete caisson is poured, there is provided at the lower end a plurality of the radial pipe receiving openings just above the bottom 4. These openings are designated 5 and are formed by an annular corrugated wall 31a. Detachable plugs 32 retained by a bolt 33 are used to fill the opening temporarily. Before insertion of the pipes, the inner plugs are removed and there is inserted in their place valve pipes 34. Concrete is poured between these pipes and the corrugated liners 31a as at 35 to firmly hold the pipes 34 in place, and thereafter pipes 14 can be put in position. Each pipe 34 is provided with an inner, apertured flange 36 having apertures 37 for receiving retaining bolts to attach the control valve 7 through suitable bolts 38. It will be noted that at this time the control element of valve 7, preferably a gate, is in its outer position so that access can be had to the inside of pipe 14 for the insertion of pipe 8. In order to seal the space between the screened pipe 14 and the valve pipe 34 there is provided a resilient washer 39 through which the bolts 38 pass. This washer is provided with an interiorly disposed skirt 40 which engages with the outer surface of the screened pipe 14 so that a tight seal is effected as the screened pipe is directed downwardly under pressure into the soil. When the screened pipe 14 is eventually pushed outwardly so that its inner end is located as shown in Figure 7 at the point marked 41, and the pipe 8 removed, then the movable member of valve 7 can become effective and thereafter the valve 7 can function to control the exit of water from the screened pipe into the caisson. There is provided an additional valve 42 in a Y 43 for cleanout purposes. This Y is connected into the pipe 44 which is connected by a flange 45 through suitable bolts in the flange 46 to the valve 7. The rear end of this pipe 44 is closed with a back plate 47 on which is mounted one of the washer bodies 24 by the bolts 48 so that the washer seals the water pipe 8 as it is moved through the rear plate 47.

In this way by these valves the water pipes 8 may be left in position while pipes 14 are being extended and the pipe system cleaned out. Thereafter, pipe 8 is withdrawn and the pipe 14 may function to deliver water to the caisson.

When the water pipe is removed and the system is in final operation the valve 42, the Y 43 and pipe 44 can be completely removed and the valve 7, now having its control member therein, used to control the exit of water into the caisson.

It will be understood that a variety of mechanisms may be employed for the accomplishment of the purposes and objects of this invention and such variations are comprehended, both as to mechanism and method, within the scope of the hereinafter appended claims.

Having fully described our invention, what we claim as new and desire to secure by Letters Patent, is:

1. In combination, a screened pipe having perforations and a head on one end of said screened pipe, an abutment fixed in the pipe adjacent to the inner end of said head having a central bore tapering inwardly toward the head end of the pipe, a plurality of spaced centrally apertured collars fixedly mounted in the pipe behind said apertured abutment, and a slidable pipe adapted to be adjustably positioned within said screened pipe and within said collars in sealing engagement therewith and adapted to abut the periphery of the bore in said abutment in its extreme outer position.

2. In combination, a screened pipe having perforations and a head on one end of said screened pipe, an abutment fixed in the pipe adjacent to the inner end of said head having a central bore tapering inwardly toward the head end of the pipe, a plurality of spaced centrally apertured collars fixedly mounted in the pipe behind said apertured abutment, a slidable pipe adapted to be adjustably positioned within said screened pipe and within said collars in sealing engagement therewith and adapted to abut said abutment in its extreme outer position, and sealing means located within said screened pipe and surrounding said water pipe behind said collars comprising a plurality of spaced annular members having inner and outer flanges projecting toward the head end of the screened pipe and rigid spaces between and supporting said members.

3. In combination, a caisson, a screened pipe having perforations and a head on the outer end of said screened pipe mounted in the side wall of said caisson, an abutment fixed in the pipe adjacent to the inner end of said head and having a central bore, a plurality of spaced centrally apertured collars fixedly mounted in the pipe behind said apertured abutment, a slidable pipe adapted to be adjustably positioned within said screened pipe and within said collars in sealing engagement therewith and adapted to abut said abutment in its extreme outer position and to seal about said bore, sealing means located within said screened pipe and surrounding said water pipe behind said collars comprising spaced annular members having inner and outer flanges projecting toward the head end of the screened pipe and rigid spaces between and supporting said members to form an adjustable unit, and means to seal said screened pipe with respect to said caisson.

4. In a water collecting system; a caisson, a screened pipe projecting radially outwardly from said caisson and having a screened head at its outer end, a plurality of spaced apertured supporting collars in said screened pipe, an abutment in the outer end of said screened pipe adjacent said head and having a conical bore therethrough, the small end of which is toward the said head, a discharge pipe in said screened pipe and having a conical end adapted for sealing engagement with the conical bore in said abutment, said discharge pipe being adjustable axially of said screened pipe, and means sealing between said pipes at their caisson ends.

5. In a water collecting system; a caisson, a screened pipe projecting radially outwardly from said caisson and having a screened head at its outer end, a plurality of spaced apertured supporting collars in said screened pipe, an abutment in the outer end of said screened pipe adjacent said head and having a conical bore therethrough, the small end of which is toward the said head, a discharge pipe in said screened pipe and having a conical end adapted for sealing engagement with the conical bore in said abutment, said discharge pipe being adjustable axially of said screened pipe, and means sealing between said pipes at their caisson ends, said sealing means comprising a plurality of flanged resilient collars, spacers between said flanged collars holding them in spaced relationship, and flanges on said spacers providing support for substantially the entire projected area of said flanged collars.

6. In a water collecting system; a caisson, a screened pipe projecting outwardly from said caisson and having a screened head at its outer end, a plurality of centrally apertured supporting collars fixed in said screened pipe and distributed therealong between the said screened head and the other end of the pipe, an abutment fixed in the outer end of said pipe adjacent the screened head and having a center bore therethrough, a discharge pipe in said screened pipe adjustable axially of the screened pipe and sealingly fitting said spaced supporting collars, the outer end of said discharge pipe being adapted for engagement with said abutment so the said pipe communicates through the bore in said abutment with said screened head, and sealing means between the said pipes at the caisson end thereof.

7. In a method of removing fines from a gravel bed, the step (a) of forcing a perforated pipe containing a plurality of axially spaced communicating areas and a perforated head axially into the gravel bed, the step (b) of restricting communication within the pipe between the said axially spaced communicating areas, and the step (c) of progressively opening adjacent areas to communication to progressively and cumulatively withdraw water and fines from within the pipe from the area of furthermost penetration to the area of least penetration.

EUGENE W. SILITCH.
ADOLPH D'AUDIFFRET.

REFERENCES CITED

The following references are of record in the file of this patent:

UNITED STATES PATENTS

| Number | Name | Date |
|---|---|---|
| 1,185,582 | Bignell | May 30, 1916 |
| 2,027,653 | Roye | Jan. 14, 1936 |
| 2,126,575 | Ranney | Aug. 9, 1938 |
| 2,126,576 | Ranney | Aug. 9, 1938 |
| 2,383,496 | Nebolsine | Aug. 28, 1945 |

OTHER REFERENCES

"The World's Largest Water Well" by Leo Ranney; reprint from American Waterworks Assn. Transactions, 1938; received in Patent Office May 1938, six pages.